(12) United States Patent
Apel et al.

(10) Patent No.: US 6,760,687 B2
(45) Date of Patent: Jul. 6, 2004

(54) SEQUENCE OF EVENTS DETECTION IN A PROCESS CONTROL SYSTEM

(75) Inventors: Michael D. Apel, Austin, TX (US); Steve Dienstbier, Round Rock, TX (US); William E. Bennett, Georgetown, TX (US); Ken J. Beoughter, Round Rock, TX (US); Marina Sokolova, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 348 days.

(21) Appl. No.: 09/871,442

(22) Filed: May 31, 2001

(65) Prior Publication Data

US 2002/0183864 A1 Dec. 5, 2002

(51) Int. Cl.$^7$ .............................................. G06F 15/00
(52) U.S. Cl. ......................... 702/187; 700/2; 700/286; 702/176
(58) Field of Search .................................. 700/286, 292, 700/22, 26, 73, 2; 702/33, 79, 176, 178, 187, 188

(56) References Cited

U.S. PATENT DOCUMENTS

| | | | | |
|---|---|---|---|---|
| 5,027,297 A | * | 6/1991 | Garitty et al. | 702/187 |
| 5,223,827 A | * | 6/1993 | Bell et al. | 714/704 |
| 5,471,631 A | | 11/1995 | Beardsley et al. | 395/650 |
| 5,795,161 A | * | 8/1998 | Vogel | 434/350 |
| 6,098,178 A | * | 8/2000 | Moretti et al. | 713/500 |
| 6,104,729 A | * | 8/2000 | Hellum et al. | 370/503 |
| 6,135,777 A | * | 10/2000 | Vogel | 434/350 |
| 6,191,821 B1 | * | 2/2001 | Kupnicki | 348/512 |

FOREIGN PATENT DOCUMENTS

EP          0 585 479 A1    3/1994

* cited by examiner

Primary Examiner—Anil Khatri
Assistant Examiner—Ronald D Hartman, Jr.
(74) Attorney, Agent, or Firm—Marshall, Gerstein & Borun LLP (57) ABSTRACT

A sequence of events detection system for use in a process control system uses sequence of events detection cards to detect and store indications of events and the times at which these events take place within the process control network. The sequence of events reporting system includes a stable master time source that is used to periodically time synchronize secondary clocks within each of the nodes of the process control system. Free running counters are located within each of the sequence of events detection cards at each node and these free running counters are used to mark each event with a counter value when the sequence of events detection card first detects the event. Indications of the event and of the counter value associated with a detected event are sent from each of the sequence1 of events detection cards to a corresponding controller which uses its secondary clock, a further free running counter and the value of the sequence of events counter assigned to the event to ascertain the actual or absolute time that the event was detected at the sequence of events card. The event and the absolute time for that event is then sent to a sequence of events reporting database, where this information is stored to form a system wide sequence of events log.

36 Claims, 2 Drawing Sheets

FIG. 1

| I.D. | Event Value | Counter Value |
|---|---|---|
| EVENT 1 | HI | 545 |
| EVENT 2 | LOW | 972 |
| EVENT 3 | LOW | 1153 |
| . . . | | |
| EVENT 8 | HI | 2024 |

| Event 1 | HI | 545 | Event 2 | LOW | 972 | . . . | EVENT 8 | HI | 2024 | 5043 |

FIG. 4

SEQUENCE OF EVENTS DETECTION IN A PROCESS CONTROL SYSTEM

FIELD OF THE INVENTION

The present invention relates generally to process control systems and, more particularly, to detecting, storing and reporting the sequence of detectable events occurring within a process control system.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. Information from the field devices and the controllers is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controllers via an analog bus or analog lines. These 4 to 20 milliamp signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®V, Device-Net®, and CAN protocols, have been developed to enable smart field devices made by different manufacturers to be used together within the same process control network.

Moreover, there has been a move within the process control industry to decentralize process control functions. For example, the all-digital, two-wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same device or within different devices), and performs some process control operation, such as measuring or detecting a process parameter, controlling a device or performing a control operation, such as implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

Furthermore, in many process plants, signals associated with significant events, such as signals associated with the position of certain safety switches or shutdown valves, signals indicating an overflow or underflow detected by certain sensors, signals associated with the operation of important power generation or control devices, signals from fault detection devices or other binary on-off type signals associated with devices within the plant are monitored to detect changes in these signals and to thereby detect "events" within the process plant. The time at which these monitored events occur are recorded and stored in a sequence of events database for use in, for example, debugging the system after a failure or other significant operational situation has occurred.

The use of a sequence of events (SOE) database is beneficial because the occurrence of one event, such as the failure of a device or a communication channel, may cause other events to occur, which may cause still other events to occur eventually leading to, for example, a cascading complete or partial shutdown of the process control plant. To ascertain the ultimate source of the failure in an attempt to correct the problem, a maintenance or control operator may view the sequence of events log stored within the SOE database to determine which events occurred in what order so as to ascertain the precipitating cause of the failure within the system.

The use of sequence of events reporting is common and fairly straight forward in a system having only one node or having a single controller attached to devices through one sequence of events SOE input/output (P/O) detection card, as all the monitored event information passes through the same SOE card and controller. However, in a process control system having a single controller coupled to multiple SOE cards, or in a system having multiple controllers at different nodes, each of which is connected to one or more devices via one or more SOE cards, sequence of events reporting becomes more difficult because the controllers and each of the different SOE cards must be time synchronized to accurately record the order of different events occurring in different parts of the plant. If the controllers or the SOE cards are out of time synchronization, the time information in the sequence of events log is likely to be incorrect which may lead the events being sequenced in an improper order. Further, because the multiple events resulting in a significant event, such as a failure of a node, typically occur very rapidly, e.g., within ten milliseconds of each other, it is desirable to increase the time sensitivity of the sequence of events reporting to the order of five milliseconds be able to detect the actual order in which the different monitored events occur. Generally speaking, this time sensitivity has been very difficult to obtain without highly accurate or synchronized clocks at each SOE card. Unfortunately, it can be prohibitively expensive to place an accurate and stable clock in each SOE card and it can be very difficult to accurately time synchronize many clocks in the system in order to time stamp events when these events are detected at the SOE cards.

SUMMARY OF THE INVENTION

A sequence of events detection system and method for use in a process control network uses SOE cards to automatically detect and store indications of events and the times at which these events took place within the process control network. The sequence of events reporting system includes a stable master time source, such as a global positioning system (GPS) receiver which is used to periodically time synchronize clocks within each of the nodes of the system, such as within each of the controllers, user workstations, etc. Free running counters, such as quartz counters, are located within each controller and within each SOE card being used to detect events to be stored in the sequence of events log. These free running counters are used to mark each event with a counter value when the SOE card or controller first detects the event. Indications of the event and of the counter value associated with a detected event are sent to a corresponding controller (if need be), which uses its clock, its counter and an indication of the value of the SOE counter assigned to the event to ascertain the actual or absolute time that the event was detected at the SOE card. The event and the time for that event is then sent to a sequence of events reporting database, where this information is stored to form a system-wide sequence of events log. The receipt of an event in the sequence of events database may be acknowledged back to a controller and SOE card which enables the SOE card to clear that event from its memory. The use of simple counters in the SOE cards and clocks in the controllers reduces the cost and complexity of the system while still enabling a highly time sensitive or time discriminating network-wide sequence of events reporting system.

According to one aspect of the invention, a sequence of events detection system includes a master clock, a first device, and a second device. The first device is communicatively coupled to the master clock and includes a first counter and a secondary clock time synchronized to the master clock. The second device is communicatively coupled to the first device and includes an event buffer and a second counter. The second device also includes a processor programmed to, upon the detection of an event, store an indication of the event in the event buffer and store the value of the second counter at the time of the detection of the event as an event counter value in the event buffer. The processor of the second device is further programmed to send an event message to the first device, the event message including the indication of the stored event and an indiction of the event counter value for the event. Still further, the first device includes a processor programmed to use the first counter, the secondary clock and the indication of the event counter value within the event message to assign an absolute time to the detection of the event. If desired, the first device may send a further event message including the indication of the event and the absolute time for the event to a sequence of events database which stores events detected at different nodes of the process control system.

DESCRIPTION OF THE PREFERRED EMBODIMENTS

Figure 1:
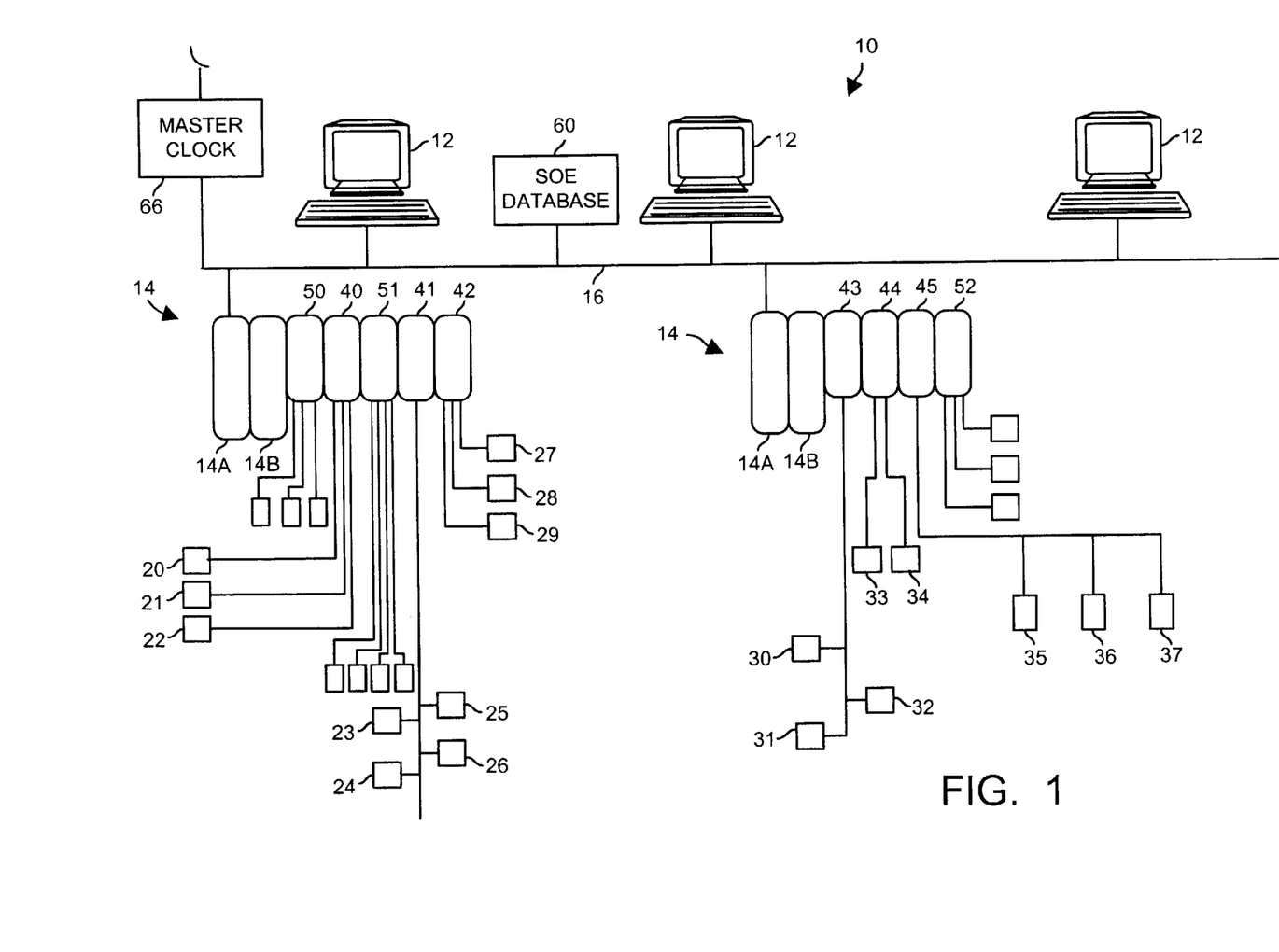
FIG. 1 is a block diagram of an exemplary process control network in which a sequence of events reporting system and method can be used.

Referring now to FIG. 1, a process control system 10 includes one or more host workstations, computers or user interfaces 12 (which may be any type of personal computers, workstations, etc.) connected to multiple controllers 14 via a bus 16. The bus 16 may use any desired or suitable communication protocol, such as an Ethernet protocol, or may instead be replaced with any other desired communication network, such as a wireless network, a non-bus based network, etc. The controllers 14, which may be by way of example only, DeltaV™ controllers sold by Fisher-Rosemount Systems, Inc., are connected to field devices 20–37 via traditional input/output (I/O) cards 40–45. Although not necessary, each of the controllers 14 may include a primary controller 14A and a redundant or backup controller 14B, if so desired. In the system illustrated in FIG. 1, the controllers 14 are connected through a standard or known DeltaV backplane to the I/O cards 40–45, each of which is connected to one or more field devices via known communication links using known communication protocols, such as the 4–20 milliamp protocol, the HART, Fieldbus or other smart device protocol or any other desired protocol either now known or developed in the future. In the example process control network 10 of FIG. 1, the I/O cards 40 and 44 are connected to the field devices 20–22 and 33–34, respectively, using a HART communication protocol while the I/O devices 41, 43 and 45 are connected to the field devices 23–26, 30–32 and 35–37, respectively, using a Fieldbus protocol bus. For the sake of illustration, the I/O device 42 is connected to field devices 27–29 via 4–20 mA lines.

As is known, each of the primary controllers 14A implements or oversees a process control routine stored therein or otherwise associated therewith and communicates with the field devices 20–37 and the computers 12 to control a process or a portion of a process in any desired manner. The field devices 20–37 may be any types of devices, such as sensors, valves, transmitters, positioners, etc. while the I/O cards 40–45 may be any types of I/O devices conforming to any desired communication or controller protocol. Of course, the field devices 20–37 could conform to any other desired standard(s) or protocols besides the HART and Fieldbus protocols, including any standard or proprietary protocol now available or any such protocol developed in the future.

Still further, SOE cards 50, 51 and 52 are coupled to the controllers 14 via, for example, the backplane, and in this example receive binary inputs, e.g., high or low (on or off) inputs from different devices within the process control network 10. For example, outputs of or indications of the position of certain switches, valves, binary level, pressure or other types of sensors, fault detection units, etc. may be coupled to the channels or inputs of each of the SOE cards 50, 51 and 52. The events being detected may be signals from the field devices 20–37 or from other devices not otherwise connected to the controllers 14 if so desired. Furthermore, any desired events can be detected and detected events are not limited to ones reported by binary signals. Generally speaking, the SOE cards 50, 51 and 52 detect the change of input signals at the channels thereof and store an indication of these changes in a memory or buffer of the cards 50, 51 and 52.

A sequence of events (SOE) database or server 60 is connected to the process control system 10 and, in the embodiment illustrated in FIG. 1, to the bus 16. The SOE database 60 receives event information from the controllers 14 and, if desired, other nodes attached to the bus 16 such as the user interfaces or computers 12. In addition, a master time source or master clock 66 which may include, for example, a GPS receiver, is also connected within the process control system 10 and, in particular, to the bus 16. The master clock 66 provides a single stable time source that is periodically used to update secondary clocks at each node reporting events in the process control system 10, including clocks within the controllers 14, the user interfaces 12 and the SOE database 60 if so desired. As noted above, the master clock 66 could include a GPS receiver that periodically receives a time signal from a satellite and updates an internal clock with that time. However, the master clock 66 could be any other desired time source, including, for example, a clock local to the process control system 10, a clock updated by the atomic clock source via other communication networks, a clock associated with a processor or other computer within the process control system 10, etc. Also, while the SOE database 60 and the master clock 66 are illustrated as being within separate workstations or nodes of the process control system 10, either or both of these units could be located in workstations or computers which are used for other purposes as well, such as a user interface, a data historian, etc. Still further, these components could be connected to the process control system 10 via other communication lines or structures and need not be connected directly to the controllers 14 via the bus 16.

Figure 2:
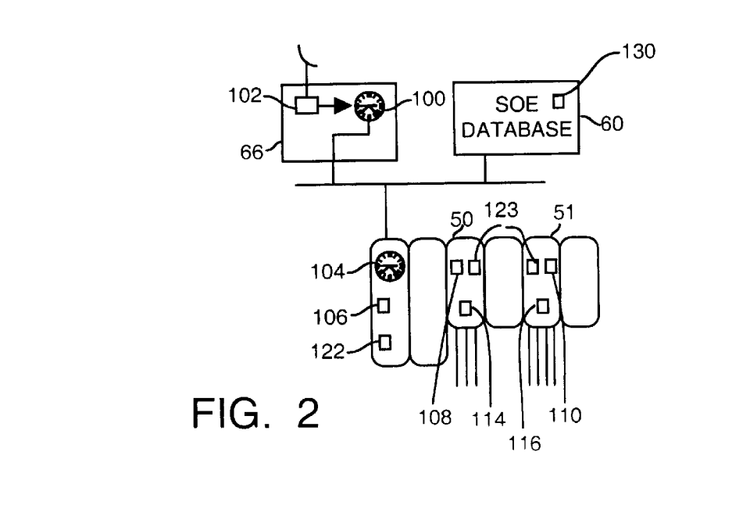
FIG. 2 is a block diagram of a portion of the process control network of FIG. 1 illustrating a sequence of events database, a controller, and a number of SOE cards in more detail.

Referring now to FIG. 2, a block diagram of portions of the process control network 10 of FIG. 1 are illustrated in more detail. As illustrated in FIG. 2, the master clock 66 includes a clock 100 that stores the current system wide time and GPS receiver hardware 102 that updates the clock 100 with the exact time. Periodically, such as every 30 seconds when the process control system 10 is first brought on line but less frequently after the system 10 is up and running, the master clock 66 provides, for example, a UDP message to each of the nodes including the controllers 14 indicating the exact time for the system. Standard Network Time Protocol (NTP) software within the controllers 14 and the computers at the other nodes such as at the SOE database 60 as well as the user interfaces 12 implement procedures for determining the amount of time it took the clock signal to reach the node via the network bus 16 and uses this software to estimate the exact synchronized time. This software then updates the secondary clocks at each node. Of course, any other method of synchronizing the clocks at each node to the master clock 66 could be used instead.

As noted above, each of the controllers 14 (as well as the other nodes within the system if so desired) includes a clock 104 which is updated by the master clock 66 and NTP software. Each of the controllers 14 also includes a free running counter 106 which may be, for example, a 16 bit or a 32 bit counter and may count at a rate of, for example, about 10 microseconds per clock tick. This will be referred to as the time reference of the counter 106. The counters 106 may be any suitable counters, such as quartz counters. In fact, in many cases, the counter 106 can be a typical counter provided with standard processing units or CPUs within the controllers 14. Still further, each of the SOE cards 50, 51 and 52 includes a free running counter (counters 108 and 110 are illustrated for the SOE cards 50 and 51 in FIG. 2). The counters 108 and 110 may be, for example, 8 microsecond counters and, again, these counters can be the counters provided with the CPUs normally associated with known or standard SOE detection cards or may be any other desired counters. Still further, each of the SOE cards 50 and 51 includes an event buffer (buffers 114 and 116 are illustrated in FIG. 2) which stores detected events that occur within the devices being monitored. Still further, the controller 14 includes a processor and memory 122 and each of the SOE detection cards 50 and 51 includes a separate processor and memory 123.

During operation, the counters 106, 108 and 110 run freely (and, if desired, independently) within the controller 14 and the SOE cards 50 and 51. NTP or other time synchronization software is used within the controller 14 to relate a particular value of the counter 106 to an absolute time as defined by the clock 104. If desired, however, the counter 106 within the controller 14 may be periodically measured against the clock 104 so that the time between the individual counter tics within the counter 106 may be actually measured and this technique may be used to relate values of the counter 106 to absolute times as defined by the clock 104. Of course, any other manner of relating values of the counter 106 to an absolute time as defined by the clock 104 may be used as well.

Figure 3:
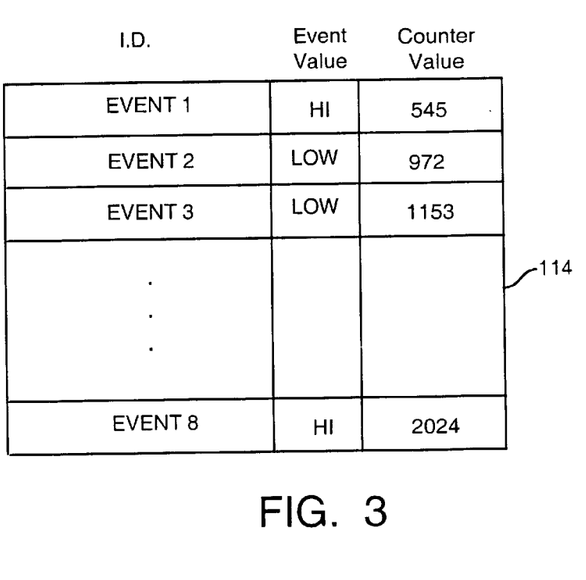
FIG. 3 is a diagram of an event log within one of the SOE cards of FIG. 2.

For the sake of discussion, the operation of the SOE device 50 in conjunction with the controller 14A of FIG. 2 will be discussed, it being understood that the same principles apply to the operations of the other SOE detection cards and controllers. Whenever the SOE card 50 detects an event by detecting a change in the state or value of one of the channels monitored by this card, i.e., a change in one of the inputs to the card 50, the SOE card 50 stores an indication of the event in the event buffer 114. This functionality can be realized by routines stored in the memory and executed on the processor 123 of the card 50. The indication of the event may include an event identification, such an identification of the channel, the signal value associated with the event (i.e., that the channel changed from high to low or from low to high) and the value of the counter 108 at the time that the event was detected. An exemplary event buffer 114 is illustrated in FIG. 3 in which the event identifications for detected events are stored in the left hand column of the buffer, the signal value or state that the channel changed to is stored in the middle column and the value of the counter 108 when the event was detected is stored in the right hand column. Of course, the event indications may be stored in any desired manner, and the event identification may take any desired form, such as an indication of the channel number, a tag or name associated with the channel or device driving the channel, etc.

As events are detected, information pertaining to these events and the counter value at the time that these events are detected are stored in the buffer 114. Periodically, such as when the buffer 114 reaches a certain level, after a specific period of time, or whenever the controller 14A gives the SOE card 50 the opportunity to send a message to the controller 14A via the backplane, the SOE card 50 sends an event message to the controller 14A including some or all of the event data stored within the buffer 114 (including the event identification, the event signal state or value and a time or elapsed counter value determined from the counter value stored for each event). While the SOE card 50 may send event data pertaining to one event and its associated counter value in a given event message, the SOE card 50 may instead send an event message having two or more sets of event data concatenated, such as eight or 16 sets of event data.

Figure 4:
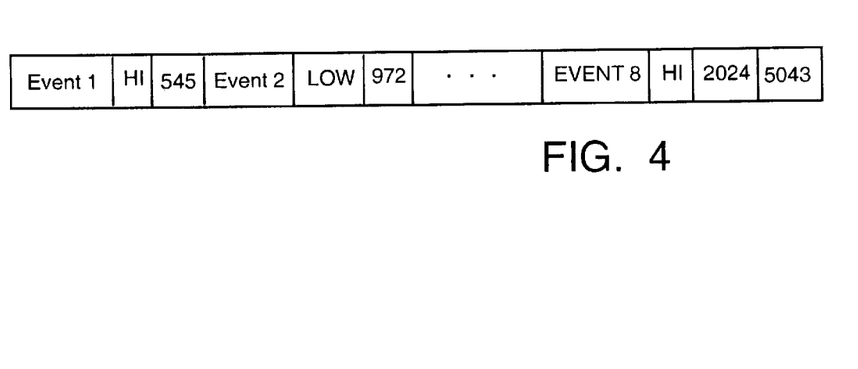
FIG. 4 is a diagram of an event message sent to the controller of FIG. 2 by one of the SOE cards.

In one embodiment, to create an event message, the SOE card 50 marks or stores the value of the counter 108 at a particular time, such as at the start of the message period, i.e., at the beginning of the time that the controller 14A enables the SOE card 50 to send event messages to the controller 14A. Incidentally, the controller 14A marks or stores the value of its counter 106 at the same particular time. Next as part of the event message, the SOE card 50 sends the event identification, the event state (if desired) and a counter value computed, in this embodiment, as the difference or offset between the counter value of the counter 108 at the start of event message and the counter value stored for the event in the buffer 114. Thus, in the example of FIG. 3, if the value of the counter 106 at the start of the event message was marked or stored as 4000, the offset counter value for Event 1 would be 4000–545 which equals 3455. Likewise, the offset counter value for Event 2 would be 4000–972 which equals 3028. The counter value offset is essentially the difference in the value of the counter 108 at the start of the event message and the value of the counter 108 when the event was originally detected. Preferably, wrap-around in the counter 108 is detected and accounted for in this difference computation using modulo subtraction. In this manner, the elapsed number of ticks of the counter 108 between the start time of the event message and the time that each event is detected is sent as part of the event message. However, if desired, both the counter values of the counter 108 at the start time of the event message and the counter value stored for each event when detected could be sent as part of the event message and the difference between these values could be determined at the controller 14A. Such an event message is illustrated in FIG. 4. Of course, other manners of computing and sending a counter value based on the counter value stored at the detection time for each event could be used as well.

As noted above, when the controller 14A enables the SOE card 50 to start the event message (such as by setting a write enable line for the SOE card 50 on the backplane to a high state), the controller 14A using a routine stored in and executed on the processor 122 also stores or marks the value of its counter 106. This counter value is the value of the counter 106 at the start time of the event message which, as indicated above, can be converted into an absolute time within the controller 14 if so desired. Next, after the controller 14A receives the event message from the SOE card 50, the controller 14A (or the processor thereof) computes an absolute time at which each different event within the event message was detected by the SOE card 50. In particular, the controller 14 converts the counter offset value within the event message (or computed by the controller 14A based on the counter values in the event message) for a particular event (which is based on the time reference of the counter 108 within the SOE card 50) into a scaled counter offset value that is based on the time reference of the counter 106 within the controller 14A. This step is necessary in cases where the counters within the controller 14A and the SOE card 50 run at a different rates. In the simplest case, the ratio of the rate of the counter 108 within the SOE card 50 over the rate of the counter 106 within the controller 14A can be multiplied by the counter offset value for a particular event to get a scaled counter offset value. Next the scaled counter offset value is subtracted from the value of the counter 106 at the start of the message to obtain the value of the counter 106 when the event was detected within the SOE card 50. This counter value can then be converted into an absolute time as defined by the clock 104 using standard NTP software. All of this processing can be implemented in a routine stored on and executed by the memory/processor 122 of the controller 14.

Of course, if desired, the absolute time for an event could be computed in various other manners such as, by for example, determining an absolute time associated with the value of the counter 106 at the start time of the event message, converting the scaled or the unscaled counter offset value into an absolute offset time and subtracting the absolute offset time from the absolute time associated with the start of the event message to determine an absolute time associated with the detection of an event. Similarly, the counter offset value for an event could be multiplied by the rate of the counter 108 to define an absolute offset time and that absolute offset time could be subtracted from the absolute time associated with the start of the event message to determine an absolute time for an event detection. Of course, those skilled in the art will realize that other manners of using the absolute or offset values of the counters 106 and 108 to determine an absolute time for the detection of an event in the SOE card 50 also exist and could be used instead.

As will be understood, the controller 14A determines an absolute time for each event within an event message using the principles discussed above. After the controller 14A establishes an absolute time for each of the events within an event message, the controller 14A sends a message including an indication of the event as well as the absolute time for the event to the sequence of events database 60 via the bus 16. The sequence of events database 60 then stores these events in a database 120 for future retrieval by, for example, a user or other application within the process control system 10. Of course, the controller 14A may send one or more than one set of events to the SOE database 60 in any message. Furthermore, if desired, the controller 14A may append information to the event message it creates to help further identify an event. Such further information may include an indication of the SOE device or card which generated the original event message containing the event, a user readable indication or identification of the event, etc. Likewise, the SOE database 60 may decode the event identification information either created by the SOE device (such as a channel number) and by the controller (such as a indication of the originating SOE device) to determine a more understandable or readable identification of the event (as determined by the configuration information of the process plant 10) and store this information in memory for retrieval by a user or other application.

As will be understood, each of the separate SOE devices or cards associated with each of the controllers within the process control system 10 performs these same functions. In this manner, each controller 14 is able to assign an absolute time to events that are detected within the different SOE cards attached thereto without the need of having to synchronize clocks within each of the SOE devices. Still further, each of the controllers 14 within the system 10 operates separately and, therefore, can send separate events along with absolute times for those events to the sequence of events database 60 at different times and the sequence of events database 60 can place the separate events along with their corresponding absolute times in chronological order even though these events come from different controllers and occur over a wide range of times.

Preferably, upon receipt of an event message from a controller 14 and storing of that event data in the SOE database 60, a routine stored within a memory and executed on a processor 30 of the SOE database 60 acknowledges receipt of the event (or events) by sending an acknowledgement signal back to the controller 14 which then sends an acknowledgment signal to the particular SOE device which detected the event. Then, in a preferred embodiment, upon receipt of the acknowledgment signal, the SOE device clears the acknowledged event (or events) from its buffer to enable further events to be stored therein. In this manner, if a controller goes down after it has polled an SOE device and received event information from that SOE device, but before that controller has decoded and sent the event information to the SOE database 60, or if communication of the event message is corrupted or lost, the event information is still stored within the SOE device and may be retrieved by, for example, a backup controller at a later time. Because the backup controller or other device is still time synchronized within the system 10 (as it has its own clock and counter), this backup controller or other device can still compute absolute times at which the events occurred within the SOB devices using the technique described above.

Using the sequence of events reporting system described herein, it is possible to use a single master clock source to synchronize a single clock at each node of the system and use non-synchronized, free running counters in different devices at each node and still determine absolute times associated with events detected in the different devices at each node.

In addition to detecting events in other devices, the SOE cards 50, 51 and 52 or even the controllers 14 can detect certain events relevant to the events being detected. For example, an SOE card, such as the card 50, may monitor a channel and detect the state of the signal on that channel is changing many times which may be caused by, for example, a faulty connection to the SOE device, a short in the line, etc. Of course, a separate event is detected each time the channel value changes. If the number of changes in a channel over a particular period of time reaches a threshold value, the SOE device 50 may go into a chatter control mode for that channel and stop reporting the detected events on that channel. When doing this, however, the SOE device 50 may store an event in its event buffer 114 (along with a corresponding value of the counter 108) indicating that the SOE card 50 entered a chatter control mode for that channel. Similarly, if the chattering on a channel stops or goes below a threshold, the SOE card 50 may exit the chatter control mode and place a corresponding event message in its event buffer 114 at that time. Of course, these chatter control events are reported to the SOE database 60 in the same manner as other detected events.

Similarly, other events such as an event buffer overflow, a controller being out of time synchronization (which may be determined by the NTP software), a counter failure or any other desired or suitable event relating to the detection or reporting of events stored in the SOE database 60 could be detected and reported as an event. Still further, if desired, the events to be stored in the SOE database 60 could be reported by the controllers 14 similar to other events which are stored in, for example, a historian except that they may have an additional field indicating that they are SOE events. Still further, the same memory could be used to store the SOE events and regular events, if so desired.

It has been determined that if counters with rates of 10 and eight microseconds are used in the controllers 14 and SOE cards 50, 51 and 52, respectively, and clocks and synchronizing software with sensitivities of five milliseconds, the system described herein can provide a system wide SOE database that has at least five millisecond time discrimination capability. However, better sensitivities may be attainable.

In any event, the use of the present SOE system enables cheap or inexpensive counters to be provided within each of the SOE devices (which are usually the most numerous devices in the SOE reporting system), a single clock at each node and a single system wide master clock to provide a highly accurate and flexible SOE system instead of requiring a synchronized clock in each controller and/or SOE device.

Although the sequence of events reporting system described herein is preferably implemented in software, it may be implemented in hardware, firmware, etc., and may be implemented by any other processor associated with the process control system 10. Thus, the routines described herein may be implemented in a standard multi-purpose CPU or on specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A sequence of events detection system comprising:
   a master clock;
   a first device communicatively coupled to the master clock including a first counter and a secondary clock time synchronized to the master clock; and
   a second device communicatively coupled to the first device including an event buffer and a second counter;
   wherein the second device includes a processor programmed to, upon the detection of an event, store an indication of the event in the event buffer and store the value of the second counter at the time of the detection of the event as an event counter value in the event buffer and further programmed to send an event message to the first device, the event message including the indication of the event and an indication of the event counter value for the event; and
   wherein the first device includes a processor programmed to use the first counter, the secondary clock and the indication of the event counter value within the event message to assign an absolute time to the detection of the event.

2. The sequence of events detection system of claim 1, further including a database communicatively coupled to the first device and wherein the processor of the first device is programmed to send a further event message to the database, the further event message including the indication of the event and the absolute time assigned to the event.

3. The sequence of events detection system of claim 2, wherein the database includes a further processor programmed to send an acknowledgement message acknowledging the receipt of the further event message.

4. The sequence of events detection system of claim 3, wherein the processor of the second device is further programmed to retain the event indication and the event counter value in the event buffer until the second device receives an acknowledgement that the database has received the further event message.

5. The sequence of events detection system of claim 1, wherein the processor of the second device is programmed to store a signal value for the detected event in the event buffer and to send the signal value of the detected event as part of the event message.

6. The sequence of events detection system of claim 1, wherein the processor of the second device is programmed to send the stored event counter value as the indication of the event counter value in the event message and is further programmed to send the value of the second counter at a particular time to the first device as part of the event message and wherein the first processor is programmed to store the value of the first counter at the particular time and to use the value of the first counter at the particular time, the value of the second counter at the particular time, and the event counter value to assign the absolute time to the detection of the event.

7. The sequence of events detection system of claim 6, wherein the particular time is the start of the time at which the second device sends the event message to the first device.

8. The sequence of events detection system of claim 6, wherein the processor of the first device is programmed to find a second counter difference value as the difference between the value of the second counter at the particular time and the event counter value, to convert the second counter difference value into a scaled difference value for the first counter, to determine an absolute first counter value for the event by finding the difference between the scaled difference value for the first counter and the value of the first counter at the particular time and to assign the absolute time associated with the detection of the event as an absolute time associated with the absolute first counter value for the event based on the secondary clock.

9. The sequence of events detection system of claim 1, wherein the processor of the second device is programmed to determine a second counter difference value as a difference between a value of the second counter at a particular time and the event counter value for the event, and to send the second counter difference value as the indication of the event counter value and wherein the processor of the first device is programmed to assign the absolute time for the detection of the event based on the secondary clock, the value of the first counter at the particular time and the second counter difference value.

10. The sequence of events detection system of claim 9, wherein the processor of the first device is programmed to produce a scaled first counter difference value from the second counter difference value.

11. The sequence of events detection system of claim 9, wherein the particular time is the start of the time at which the second device sends the event message to the first device.

12. The sequence of events detection system of claim 9, wherein the processor of the first device is programmed to convert the second counter difference value into a scaled difference value for the first counter, to determine an absolute first counter value for the event by finding the difference between the scaled difference value for the first counter and the value of the first counter at the particular time and to assign the absolute time associated with the detection of the event as an absolute time associated with the absolute first counter value for the event based on the secondary clock.

13. The sequence of events detection system of claim 1, wherein the master clock includes a global positioning system receiver.

14. A sequence of events detection system comprising:
a database;
a master clock;
one or more primary devices communicatively coupled to the master clock, each primary device including a first counter and a secondary clock time synchronized to the master clock; and
a plurality of secondary devices each communicatively coupled to one of the primary devices, each secondary device including an event buffer, a second counter, and a processor programmed to, upon the detection of an event, store an indication of the event in the event buffer and store the value of the second counter at the time of the detection of the event as an event counter value in the event buffer and further programmed to send an event message to an associated one of the first devices, the event message including the indication of the event and an indication of the event counter value for the event;
wherein at least one of the first devices further includes a processor programmed to use the first counter, the secondary clock and the indication of the event counter value within the event message to assign an absolute time to the detection of the event.

15. The sequence of events detection system of claim 14, wherein the processor of the at least one of the first devices is programmed to send a further event message to the database including the indication of the event and the absolute time assigned to the detection of the event.

16. The sequence of events detection system of claim 15, wherein the database includes a further processor programmed to send an acknowledgement message acknowledging the receipt of the further event message.

17. The sequence of events detection system of claim 16, wherein the processor of each of the second devices is further programmed to retain an associated event indication and event counter value in the event buffer until the second device receives an acknowledgement that the database has received a further event message associated with the stored event indication and event counter value.

18. The sequence of events detection system of claim 14, wherein the processor of each of the second devices is programmed to store a signal value for a detected event in the associated event buffer and to send the signal value of the detected event as part of the event message.

19. The sequence of events detection system of claim 14, wherein the processor of each of the second devices is programmed to send an associated event counter value as the indication of the event counter value in the event message and is programmed to send a value of the second counter at a particular time to an associated one of the first devices as part of the event message and wherein the processor of the associated one of the first devices is programmed to store the value of the first counter at the particular time, and to use the value of the first counter at the particular time, the value of the second counter at the particular time, the event counter value and the secondary clock to assign the absolute time to the detection of the event.

20. The sequence of events detection system of claim 14, wherein the first devices are controllers and the second devices are input/output devices.

21. The sequence of events detection system of claim 14, wherein the processor of each of the second devices is programmed to compute a difference value as the difference between one of the event counter values and a value of the second counter at a particular time, to send the difference value as the indication of the event counter value in the event message and wherein the processor of the associated one of the first devices is programmed to store the value of the first counter at the particular time, and to use the value of the first counter at the particular time, the difference value and the secondary clock to assign the absolute time to the detection of the event.

22. A sequence of events detection system for use in a process control system having a database, a master clock, a primary device communicatively coupled to the master clock and including a first processor, a first memory, a first counter and a secondary clock time synchronized to the master clock, and a secondary device communicatively coupled the primary device and including a second processor, a second memory, an event buffer and a second counter, the sequence of events detection system comprising:

a first routine stored in the first memory and adapted to be executed on the first processor; and a second routine stored in the second memory and adapted to be executed on the second processor which, upon the detection of an event by the secondary device, stores an indication of the event in the event buffer and stores the value of the second counter at the time of the detection of the event as an event counter value in the event buffer and which further sends an event message to the first device, the event message including the indication of the event and an indiction of the event counter value for the event;

wherein the first routine is adapted to use the first counter, the secondary clock and the indication of the event counter value to assign an absolute time to the detection of the event.

23. The sequence of events detection system of claim 22, wherein the first routine is adapted to send a further event message to the database including the indication of the event and the absolute time assigned to the event.

24. The sequence of events detection system of claim 23, wherein the database includes a third processor and a third memory and further comprising a third routine stored in the third memory and adapted to be executed on the third processor to send an acknowledgement message acknowledging the receipt of the further event message.

25. The sequence of events detection system of claim 22, wherein the second routine is adapted to send the event counter value as the indication of the event counter value and to send the value of the second counter at a particular time to the primary device as part of the event message and wherein the first routine is adapted to store the value of the first counter at the particular time, and to use the value of the first counter at the particular time, the value of the second counter at the particular time, the event counter value and the secondary clock to assign the absolute time to the detection of the event.

26. The sequence of events detection system of claim 22, wherein the second routine is adapted to determine a difference value as a difference between the event counter value and a value of the second counter at a particular time and to send the difference value as the indication of the event counter value and wherein the first routine is adapted to store the value of the first counter at the particular time, and to use the value of the first counter at the particular time, the difference value and the secondary clock to assign the absolute time to the detection of the event.

27. A method of detecting events within a process control system having a database, a master clock, a first device communicatively coupled to the master clock and including a first processor, a first memory, a first counter and a secondary clock and a second device communicatively coupled the primary device and including a second processor, a second memory, an event buffer and a second counter, the method comprising the steps:

time synchronizing the secondary clock to the master clock;

storing an indication of an event in the event buffer and storing the value of the second counter upon detection of the event as an event counter value in the event buffer;

sending an event message from the second device to the first device including the indication of the event and an indication of the event counter value; and using the first counter, the secondary clock and the indication of the event counter value to assign an absolute time to the detection of the event.

28. The method of detecting events of claim 27, further including the step of sending a further event message to the database including the indication of the event and the absolute time assigned to the event.

29. The method of detecting events of claim 28, further including the step of sending an acknowledgement message acknowledging the receipt of the further event message by the database to the second device.

30. The method of detecting events of claim 29, further including the step of retaining the event indication and the event counter value in the event buffer until the second device receives an acknowledgement message indicating that the database has received the further event message.

31. The method of detecting events of claim 27, further including the step of storing a signal value for the detected event in the event buffer and sending the signal value for the detected event as part of the event message.

32. The method of detecting events of claim 27, further including the step of storing the value of the first counter and the value of the second counter at a particular time, and wherein the step of using the first counter, the secondary clock and the indication of the event counter value to assign an absolute time to the detection of the event includes the step of determining the absolute time for the detection of the event as the time defined by the secondary clock as being associated with the value of the first counter at the particular time minus a counter value defined as the difference between the second counter value at the particular time and the event counter value, this difference being scaled from the-a time reference of the second counter to the a time reference of the first counter.

33. The method of detecting events of claim 32, wherein the step of sending an event message includes the step of sending the event counter value and the value of the second counter at the particular time as part of the event message.

34. The method of detecting events of claim 32, wherein the particular time is the beginning of the time at which the event message is sent from the second device to the first device.

35. The method of detecting events of claim 32, wherein the step of sending an event message includes the step of sending the difference between the event counter value and the value of the second counter at the particular time as part of the event message.

36. The method of detecting events of claim 32, wherein the step of determining the absolute time assigned to the detection of the event includes the steps of computing the difference between the event counter value and the value of the second counter at the particular time as a difference measurement for the second counter, if necessary scaling the difference measurement for the second counter into a difference measurement for the first counter based on the a time references of the first counter and a time reference of the second counter, and computing the difference between the first counter value at the predetermined time and the difference measurement for the first counter to define an absolute first counter value associated with the detection of the event.

* * * * *

UNITED STATES PATENT AND TRADEMARK OFFICE
CERTIFICATE OF CORRECTION

PATENT NO. : 6,760,687 B2
DATED : July 6, 2004
INVENTOR(S) : Apel et al.

It is certified that error appears in the above-identified patent and that said Letters Patent is hereby corrected as shown below:

Title page,
Item [57], ABSTRACT, please delete "sequence1" and insert -- sequence --.

Column 1,
Line 50, please delete "HART®)," and insert -- HART®, --.
Line 50, please delete "WORLDFIP®V," and insert -- WORLDFIP®, --.

Column 2,
Line 37, please delete "(P/O)" and insert -- (I/O) --.

Column 6,
Line 56, please delete "16" and insert -- 16 --.

Column 7,
Line 46, please delete "run at a different rates" and insert -- run at different rates --.

Column 9,
Line 6, please delete "SOB" and insert -- SOE --.

Column 14,
Lines 38 and 39, please delete "the-a" and insert -- a --.
Line 60-61, please delete "the a time references" and insert -- a time reference --.

Signed and Sealed this

Twenty-eighth Day of December, 2004

JON W. DUDAS
*Director of the United States Patent and Trademark Office*